May 18, 1937.  F. M. LITTELL  2,080,724

VALVE AND SUPPORTING MEANS THEREFOR

Filed March 25, 1935   2 Sheets-Sheet 1

Inventor:
Frederick M. Littell.
By Wilkinson, Huxley, Byron & Knight
Attys

May 18, 1937. F. M. LITTELL 2,080,724
VALVE AND SUPPORTING MEANS THEREFOR
Filed March 25, 1935 2 Sheets-Sheet 2
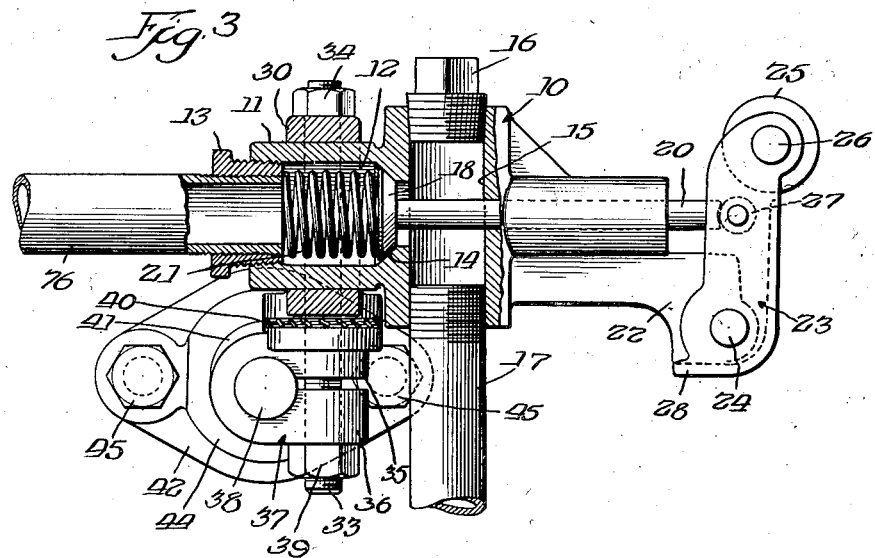
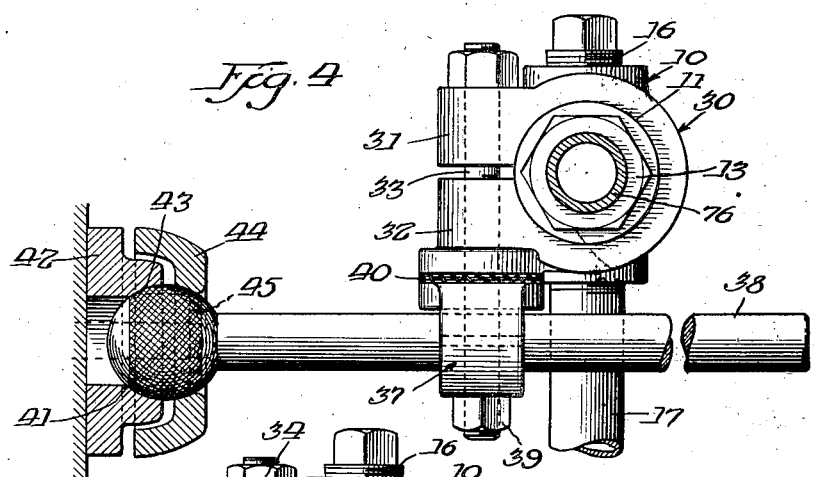
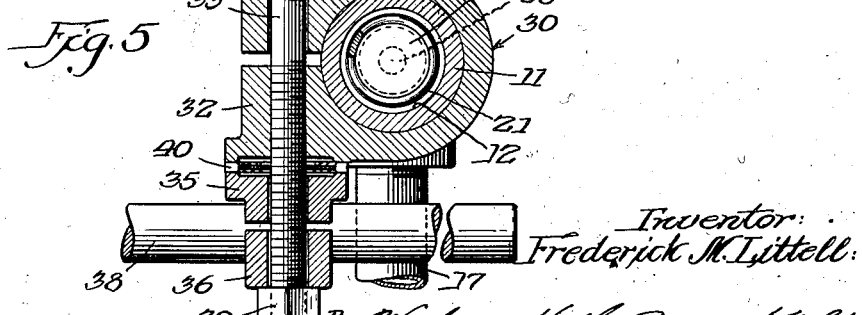
Inventor:
Frederick M. Littell Patented May 18, 1937

2,080,724

UNITED STATES PATENT OFFICE 2,080,724

VALVE AND SUPPORTING MEANS THEREFOR

Frederick M. Littell, Chicago, Ill., assignor to F. J. Littell Machine Company, Chicago, Ill., a corporation of Illinois Application March 25, 1935, Serial No. 12,833

2 Claims. (Cl. 251—134)

The invention relates to valves and has particular reference to an improved air blast valve and adjustable mounting means therefor that will give the operator a wide choice of locations for fastening the valve to the machine and much greater facility in connecting the same to the air supply and nozzle.

Air valves are applied to punch presses and the like for delivering a blast of air against the work piece to cause removal thereof from the machine and also cleaning of the die and work supporting surface. Said air valves are actuated by cam means rotated during operation of the machine and in order that the valve may be properly positioned on the punch press and other kindred machines where its operating parts will be aligned for engagement with the cam a universal mounting for a valve is desirable. The improved mounting means makes the valve practically universal in its application to punch presses and the like and also facilitates adjustment of the air nozzle with respect to the bed plate or work supporting surface of said machines.

An object of the invention resides in the provision of novel clamping means for rotatably supporting the valve and which means are designed for adjustable association with a standard to give adjustability to the valve in several directions at right angles to each other. The form of clamping means for the valve is substantially duplicated in the support for the air nozzle, making it easier for the operator to connect it up and also greatly increasing its range of adjustability with respect to the work supporting surface of the machine.

A more specific object is to provide a valve having a cylindrical body portion and clamping means therefor that will rotatably mount the valve, permitting location of its lateral pipe connections and actuating means at any angle within a complete revolution.

Another object is to provide clamping means for an air blast valve having one adjusting member which will simultaneously secure the valve against rotation on a horizontal or vertical axis and also in the desired vertical position on its supporting standard.

Another object is to provide an air blast valve having improved operating parts that will give quick opening and closing of the valve member, preventing wire drawing of the seat.

With these and other objects in view the invention may consist of certain novel features of construction and operation, as will be more fully described and particularly pointed out in the specification, drawings and claims appended hereto.

In the drawings which illustrate an embodiment of the invention and wherein like reference characters refer to like parts—

Figure 3 is a plan view of an air blast valve, parts being shown in section, and clamping means therefor showing the valve rotated a half revolution from its position in Figure 2;

Figure 4 is a rear elevational view, parts being shown in section, of the valve, clamping means and supporting standard;

Figure 5 is a sectional view taken longitudinally through the clamping means showing the common securing bolt for holding the valve to the clamping means and for securing said means to the standard.

Figure 1:
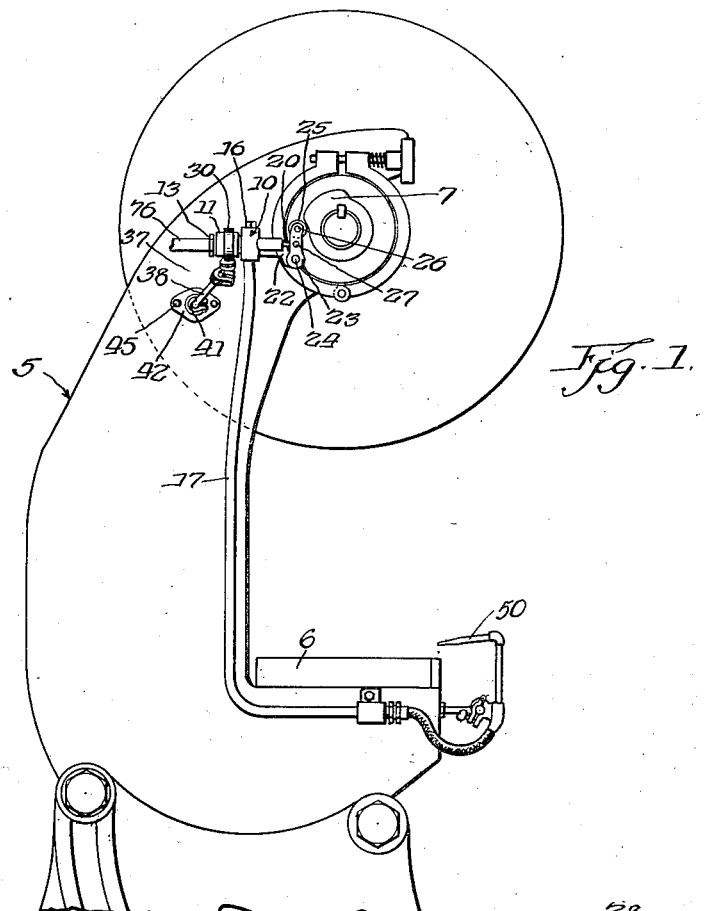
Figure 1 is a side elevational view of a punch press showing a typical installation of the invention with the air blast valve supported from a side frame member of the press and the air nozzle supported from the bed plate.

The air blast valves of the invention are adapted for attachment to a punch press 5, such as shown in Figure 1, in combination with an air nozzle connecting therewith for supplying a blast of air to the die 6 or work supporting surface to thus remove the work piece from the press. The valves are provided with operating means having intermittent contact with a cam 7 rotated during operation of the press to supply the air blast at the end of each press operation, thereby removing the work piece and maintaining the die clean for the next operation.

Referring to Figure 3 of the drawings, the improved air blast valve consists of a body designated in its entirety by 10 formed from any suitable metal such as brass or the like, and provided at one end with a cylindrical portion 11. Said portion is tubular, having a central chamber 12 receiving the pipe coupling 13 and communicating at its opposite end with a valve opening defined by the valve seat 14. Below the valve seat the valve is provided with a transversely extending bore 15 threaded at its opposite ends and receiving the pipe plug 16 and the pipe connection 17. The valve opening is normally closed by the valve 18, integral with the valve stem 20, which extends through the valve and projects from the end thereof opposite the chamber 12. The coil spring 21, located within chamber 12 and confined between the valve 18 and the pipe coupling 13 yieldingly maintains the valve against its seat, permitting movement of the valve in a direction to open the same against the tension of the spring.

The end of the valve body adjacent the projecting valve stem 20 is provided with an ear 22 pivotally supporting the roller trolley which forms the actuating member for the valve. Said trolley consists of lever 23 cored to provide spaced side members and which is pivoted to ear 22 positioned between the side members by the stud 24, said lever carrying at its outer free end the trolley wheel 25 journalled in the lever by the stud 26. The lever also carries a roller 27 positioned for engagement with the projecting end of the valve stem 20 to cause opening of the valve when the lever 23 is rocked in a counter-clockwise direction. Said arm has limited rocking movement in an opposite direction by reason of the stop 28 integral with the lever and which is adapted to contact with ear 22. Improved operation of the valve is secured by locating the roller 27 as close as possible to the trolley wheel 25. This results in maximum movement of the valve and gives a quick opening and closing to the valve to prevent wire drawing of the valve seat.

The cylindrical portion 11 of the valve body is engaged by the split collar 30 having the integral projecting portions 31 and 32, respectively, which are bored for receiving the clamping bolt 33. Portion 32 has the bolt 33 threaded therein so that said bolt is fixed in this manner to the split collar 30. Said bolt projects from the respective sides of portion 32, one end extending through and beyond portion 31 of the split collar and receiving the nut 34 by which the split collar is tightened to securely and firmly engage the cylindrical end of the valve body 10. The other projecting end of bolt 33 is threaded throughout and extends through the separable portions 35 and 36, respectively, of a second split collar 37. The standard 38 extends through the split collar 37 which is firmly and securely held on the standard by the nut 39. The faces of portions 32 and 35 of the split collars 30 and 37, respectively, are enlarged to provide a suitable friction surface for contacting with the friction washer 40 which is mounted on the bolt 33 and confined between said portions of the split collars. It will be understood from the above that rotation of nut 34 in the proper direction will draw portions 31 and 32 together to effect a tightening of the split collar 30 on the cylindrical end of the valve body, while rotation of nut 39 in a like manner effects a tightening of split collar 37 on the standard 38 and will also increase the pressure on the friction washer 40. Therefore, one adjustment is all that is required to fixedly secure the split collar 37 to the standard 38 and also fixedly secure the split collar 30 in the desired rotated position with respect to said standard. Friction washer 40 effectively prevents rotation of the split collars even when a relatively slight pressure is applied thereto.

The mounting for the valve is completed by providing a ball and socket joint for supporting the standard 38. The same consists of a ball 41 integral with one end of standard 38, a base 42 providing a seat 43 for receiving the ball of the standard and a cap 44 also providing a seat for the ball which however is opposed to seat 43. The separable portions, namely, the base and the cap, are securely bolted together by bolts 45 confining ball 41 therebetween, which is provided with a knurled surface so that the same is fixedly and securely held in adjusted position. The bolts 45 are also utilized to fixedly secure the base to the side frame of the press as shown in Figure 1. Since the valve has universal adjustability by reason of the clamping and supporting means described proper positioning of the valve is possible to align the same with the cam forming part of the press.

The valve is supplied with compressed air by the hose 76, Figure 1, which is admitted to the transverse bore 15 during opening of the valve 18. Said valve is opened through actuation of lever 23 by the cam 7 engaging the trolley wheel 25 to rock the arm in a counter-clockwise direction. This movement of the arm will reciprocate the valve stem 20 since said stem contacts with roller 27 carried by the arm, moving valve 18 inwardly against the tension of the coil spring 21. Admission of air from the supply line to the transverse bore will in turn supply the nozzle 50 connecting therewith through pipe 17 to provide the air blast delivered by said nozzle for removing the work pieces from the press. Securing the valve to the supporting standard 38 by means of the clamp including the split collar 30 permits rotation of the valve body so that the trolley wheel 25 can be located at any angle within 360 degrees, thereby facilitating the alignment of the same with the cam or other instrumentality of the press. Said clamp also permits rotation of the valve and split collar 30 on the bolt 33, which rotation is at right angles to that of the valve within the split collar. Other adjustments of the valve are possible through the split collar 37 and by means of the ball and socket support for the standard 38.

Figure 2:
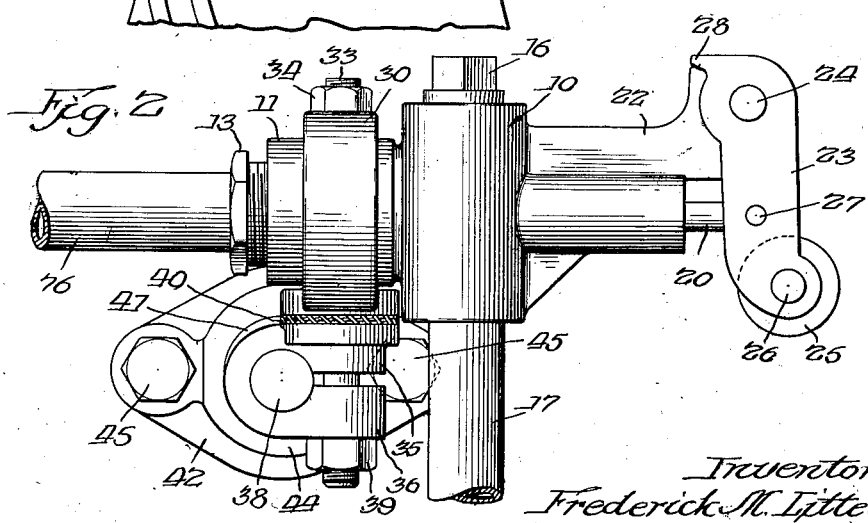
Figure 2 is a plan view of an air blast valve and clamping means therefor constructed in accordance with the invention.

Rotation of the valve body within the clamp 30 is especially desirable as actuating lever 23 can be located with the trolley wheel directed downwardly as in Figure 2, or upwardly, as shown in Figure 3, or at any desired angle within the one hundred and eighty degrees.

What is claimed is:

1. A valve for use with a punch press or like machine and adapted to be operated by a cam on said machine, including a valve body having a cylindrical portion, means projecting from the valve body for actuating the valve, a lever pivoted at one end to the valve body for actuating said means and carrying means at its outer free end for contacting the cam, and a clamping member engaging the cylindrical portion of the valve body to thus support the same in a manner permitting rotation on the longitudinal axis of the valve and also movement axially, whereby the lever may be readily aligned and located in proper spaced relation with the operating cam.

2. A valve for use with a punch press or like machine and adapted to be operated by a cam on said machine, including a valve body having a cylindrical portion, means projecting from the valve body for actuating the valve, a lever pivoted at one end for actuating said means and carrying a roller member at its outer free end for contacting the cam, and a clamping member engaging the cylindrical portion of the valve body to thus support the same in a manner permitting rotation on the longitudinal axis of the valve and also movement axially, whereby said roller member may be readily aligned with and located in proper relation to the operating cam.

FREDERICK M. LITTELL.